United States Patent [19]

Brown

[11] Patent Number: 4,893,332

[45] Date of Patent: Jan. 9, 1990

[54] LOW-POWERED REMOTE SENSOR

[75] Inventor: Richard W. Brown, Mound, Minn.

[73] Assignee: Aquatrol Corporation, Arden Hills, Minn.

[21] Appl. No.: 188,496

[22] Filed: Apr. 29, 1988

Related U.S. Application Data

[63] Continuation of Ser. No. 862,124, May 12, 1986, abandoned.

[51] Int. Cl.$^4$ ............................................. H04M 11/00
[52] U.S. Cl. ....................................... 379/97; 379/107; 379/413; 340/870.02
[58] Field of Search ...................... 379/40, 51, 55, 106, 379/107, 375, 376, 413, 414, 415, 416; 340/870.01, 870.02; 307/149; 455/343

[56] References Cited

U.S. PATENT DOCUMENTS

| | | | |
|---|---|---|---|
| Re. 28,283 | 12/1974 | Cowpland et al. | 379/414 |
| 2,326,200 | 8/1943 | Bristol | 379/350 X |
| 2,696,524 | 12/1954 | Huntington et al. | |
| 2,813,242 | 11/1957 | Crump | 363/18 |
| 3,551,598 | 12/1970 | Varda et al. | |
| 3,641,270 | 2/1972 | Ohshima et al. | 379/102 |
| 3,647,971 | 3/1972 | Cushman et al. | 379/40 |
| 3,717,858 | 2/1973 | Hadden | |
| 3,800,091 | 3/1974 | Glidden et al. | 375/45 |
| 3,870,822 | 3/1975 | Matthews | |
| 3,968,333 | 7/1976 | Simokat et al. | 379/413 |
| 3,980,996 | 9/1976 | Greenspan et al. | |
| 4,085,287 | 4/1978 | Kullmann et al. | 340/870.02 |
| 4,086,434 | 4/1978 | Bocchi | |
| 4,091,357 | 5/1978 | Nakajima et al. | |
| 4,104,486 | 8/1978 | Martin et al. | 379/107 |
| 4,132,981 | 1/1979 | White | |
| 4,147,893 | 4/1979 | Matson | 379/99 |
| 4,241,237 | 12/1980 | Paraskevakos et al. | 379/107 |
| 4,296,411 | 10/1981 | Romanelli et al. | 340/870.02 |
| 4,394,540 | 7/1983 | Willis et al. | |
| 4,471,346 | 9/1984 | Nelson et al. | |
| 4,486,625 | 12/1984 | Reinaver et al. | |
| 4,521,643 | 6/1985 | Dupuis et al. | |
| 4,532,382 | 7/1985 | Pommer, II | 379/324 |
| 4,540,849 | 9/1985 | Oliver | |
| 4,547,629 | 10/1985 | Corless | |
| 4,549,044 | 10/1985 | Durham | |
| 4,578,539 | 3/1986 | Townsing | |
| 4,639,728 | 1/1987 | Swanson | 379/107 X |

FOREIGN PATENT DOCUMENTS 1370956 10/1974 United Kingdom .

OTHER PUBLICATIONS

Terry L. Lyon, "How to Build 'Free-Power' Radios", *Popular Electronics*, Oct. 1973, pp. 62-64.

"Local Battery Charging Over Subscriber's Lines", by B. R. Freer and O. L. Matthews, *The Post Office Electrical Engineer's Journal*, vol. 66, Part 2, Jul. 1973.

*Primary Examiner*—Keith E. George
*Attorney, Agent, or Firm*—Merchant, Gould, Smith, Edell, Welter & Schmidt

[57] ABSTRACT

A low-powered remote sensor is achieved by capacitively isolating a long duration perpetual timer which is powered by removing inductively coupled AC power from telephone lines or other long lines. Three embodiments are described using this concept. The first embodiment is a remote utility sensor designed to periodically dial and transmit data to a central site via telephone lines and report its functionality on a periodic basis. The second embodiment of the remote utility sensor is used for reporting utility usage for common utilities such as gas meters, water meters, electric meters and water softeners on a periodic basis over telephone lines. The third embodiment is a remote utility sensor which continually records utility usage and can be read by a portable recording device through a remote cabled interface.

18 Claims, 9 Drawing Sheets

NO ANSWER OR BUSY

NORMAL ANSWER

DATA TRANSMISSION

LOW-POWERED REMOTE SENSOR

This is a continuation of application Ser. No. 862,124, filed May 12, 1986 now abandoned.

BACKGROUND OF THE INVENTION

This invention relates to remote sensing devices which communicate information to a central site or another location. In particular, the present invention relates to low-powered or self-powered remote sensing devices that require no renewable or rechargeable energy source.

Many remote sensing devices include means for attachment to telephone lines to automatically dial a central site upon the occurrence of an event. An example of this is a fire alarm that is programmed to dial the fire department in case of an emergency. The event that triggers the dialing would be, for instance, a smoke detector becoming activated. The problem with many of these prior art remote sensing devices is the unknown status of their functionality while they are in use but not activated. For example, one never knows whether the smoke detector will properly dial the fire department until the happening of an event.

In addition to the above, remote sensing devices require a constant source of power to keep them monitoring and functioning. Various sources of power include the AC power lines through a direct coupling, low current draw from telephone lines and battery back up. The former two sources of power are subject to interruption while the latter is subject to exhaustion. The reliability of these power sources is therefore in question leaving the monitoring capabilities of the remote sensing device subject to failure.

The present invention overcomes these and other problems by providing for an inexhaustible power source to maintain the monitoring function in a powered-up condition at all times. The monitoring feature and perpetual timing function of the present invention is powered by removing inductively coupled AC power from long line telephone wires and storing it to power low current drain CMOS devices. The perpetual timing means and monitoring portion of the present invention is isolated from the rest of the circuit through capacitive coupling to insure that the minimum amount of current drain necessary to maintain the circuit in an active condition is available.

Three forms of the present invention are disclosed, the first being a monitoring device for a water softener or the like. This device monitors the salt requirement of the softener and calls a central site when it requires servicing. The second embodiment of the present invention discloses a monitoring device for utility meters and the like which periodically calls a central site to report the utility usage. A feature of both these embodiments, in the present invention, is the fact that these devices periodically call the central site to report their functionality. In this fashion, the central site is periodically alerted to the proper functioning of the devices. Each device contains an address which is transmitted to the central site to inform it of its location. The central site includes a computer which monitors the status of all of the outlying devices and reports to an operator when a device has failed to call in within a required window of time. The operator then can send a service person out to check on the functionality of the remote sensing device.

A third form of the present invention entails a low-powered utility sensor which communicates its data through a cabled interface to another location such as the outside wall of a customer's home. This form of a sensor requires no renewable or uninterruptable power source and can be used to read internally-installed utility meters from outside the customer's building.

Although the preferred embodiment of the present invention as disclosed herein describes a remote sensing device that removes inductively coupled AC power from telephone lines, it will be understood that this principle of the present invention applies equally well to obtaining inductively coupled AC power from any long line for use in powering a low-power remote sensing device. In addition, although the preferred embodiment of the present invention relates generally to remote sensing for utility meters, it will be understood that the principle of the invention applies equally well to remote sensing and monitoring of other types of equipment such as unattended pumps, intrusion alarms and fire alarms.

SUMMARY OF THE INVENTION

The present invention includes a method and apparatus for obtaining inductively coupled AC power from long lines such as telephone lines. The AC voltage found on long lines is inductively induced by, herein referred to as coupled from, local and remote power grids and the voltage is removed through capacitive coupling to block any DC component on the line. The inductively coupled AC voltage is then rectified and regulated for use in powering remote sensors such as monitoring devices for utility meters. The remote sensing devices may include automatic dialers to call central sites on a periodic basis to report the functionality of the device, or the devices may be called from the central site.

Accordingly, it is an object of the present invention to provide a remote sensing and monitoring device which obtains its essential operating power from inductively coupled AC power from long lines such as telephone lines.

It is a further object of the present invention to provide a method or apparatus for obtaining inductively coupled AC power from long lines by means of capacitively coupling a rectifier and regulator to the long line.

It is a further object of the present invention to provide an automatic dialer coupled with a long duration timer for periodic reporting of utility usage to a central site by telephone.

It is a further object of the present invention to provide for periodic calling of a central site by the dialer mechanism to report the status of the remote sensing device.

These and other objects and advantages of the present invention will become apparent to those skilled in the art upon reading and understanding the detailed description below. The foregoing list of objectives is not intended to be exhaustive and there may be objects and advantages not yet fully appreciated by the inventor.

BRIEF DESCRIPTION OF THE DRAWINGS

In the drawings:

FIG. 2A is an alternate implementation of the method of deriving inductively coupled AC power from telephone lines;

DETAILED DESCRIPTION OF THE PREFERRED EMBODIMENT

Figure 1:
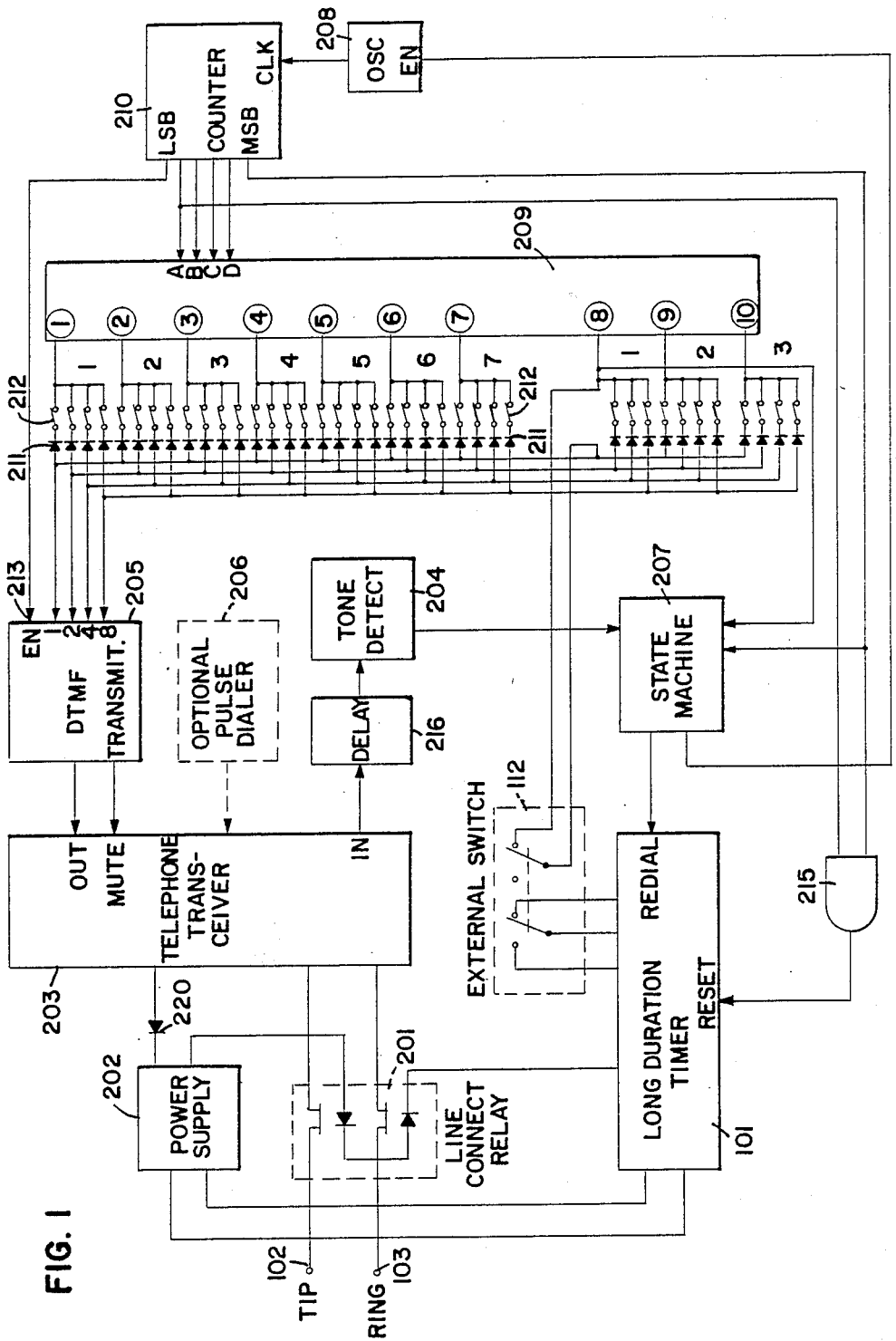
FIG. 1 is a block diagram of the first preferred embodiment of the present invention.
Figure 2:
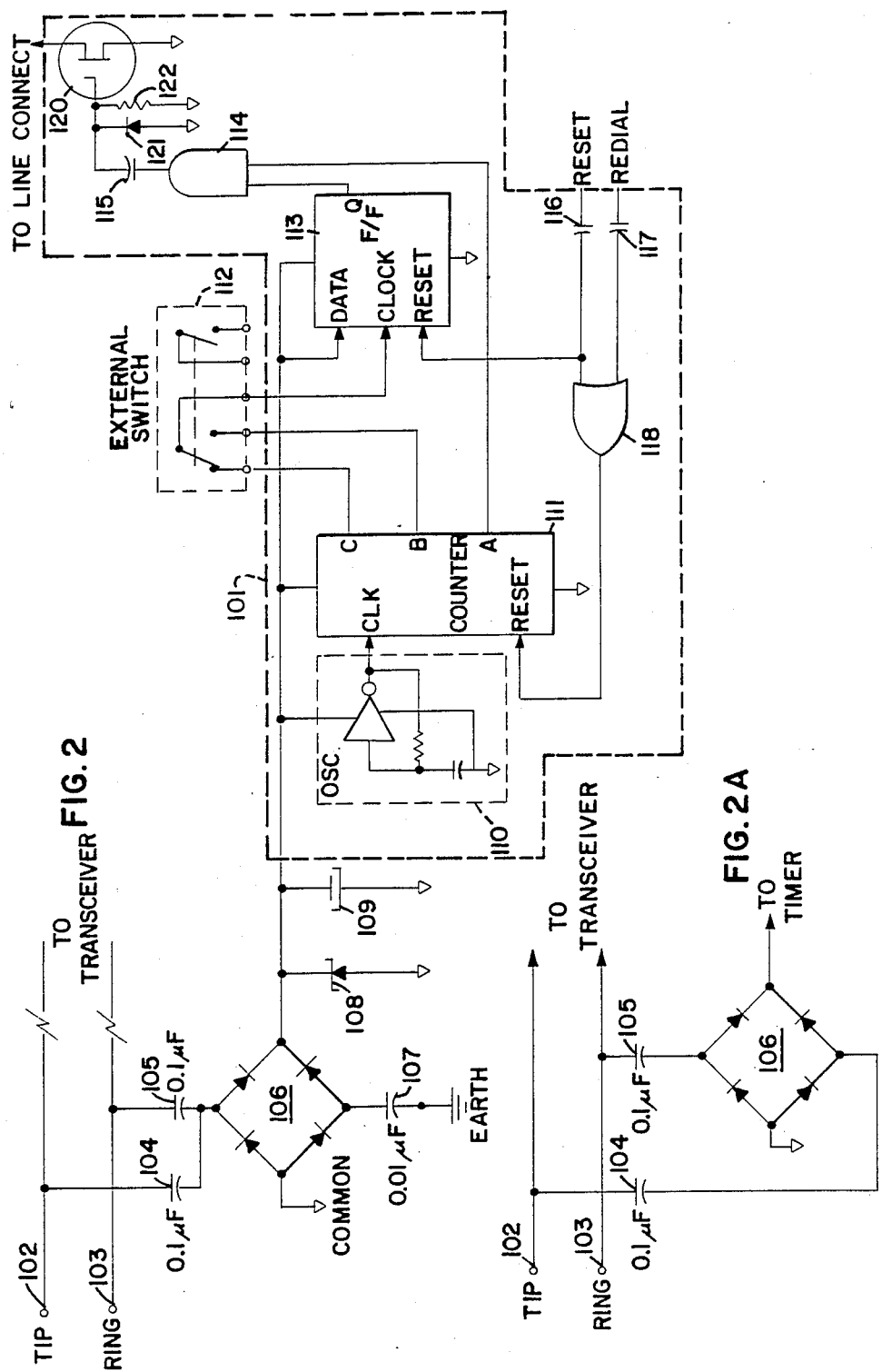
FIG. 2 is a detailed schematic diagram of the long duration counter.

Referring to FIGS. 1 and 2, the first preferred embodiment is described. FIG. 2 is a detailed schematic diagram of the long duration counter shown at 101 in FIG. 1. The long duration counter schematic shown in FIG. 2 shows a connection to the telephone line for deriving inductively coupled AC power from the telephone lines. The phone line is comprised of the tip 102 and ring 103 wires of a common telephone circuit. The tip and ring wires are tapped through capacitors 104 and 105 to connect to a bridge rectifier 106. Both the tip and ring wires of the telephone line are tapped through capacitors 104 and 105 so that a balance is maintained between the wires although it will be appreciated by those skilled in the art that the inductively coupled AC power found on telephone lines may be tapped either from the tip or ring wire individually. Also, bridge rectifier 106 is used to rectify any AC voltage taken from the telephone line although it will be appreciated by those skilled in the art that a half wave rectifier or other rectification means may be used. The other side of the bridge rectifier 106 is capacitively coupled to earth through capacitor 107. In the preferred embodiment, capacitors 104, 105 are 0.1 microfarad in value, and capacitor 107 is 0.01 microfarad, although it will be appreciated by those skilled in the art that other values may be equally effective. The break down voltage of the capacitors is preferably approximately fifty volts to insure any ringing voltage or other voltage spikes along the telephone do not break down the capacitive dielectric.

The present invention provides an untuned powering circuit coupled independent of frequency to a long wire so that it is independent of the electromagnetic frequencies captured by the inductively coupled long wire; i.e., the powering circuit is coupled, independent of frequency, to the long wire.

An alternate form of deriving inductively coupled AC power from the telephone lines is to substitute the earth connection for a connection to either the tip or ring side of the telephone line such that the bridge rectifier is capacitively coupled between the wires instead of between the wires and ground. This is shown in FIG. 2A wherein the earth connection is removed and the connection between capacitors 104 and 105 is broken. Zener diode 108 is used to regulate the voltage level and to prevent over-voltage spikes from finding their way into the delicate CMOS circuitry of the long duration timer. Electrolytic capacitor 109 is used to filter the inductively coupled AC power that is taken from the telephone lines.

It will be appreciated by those skilled in the art that the AC power found on telephone lines is inductively coupled from power grids that typically pervade the American continent. It will be appreciated that any long line may be used to collect AC power that is leaked into the environment surrounding a power grid. This can be shown quite easily by a simple experiment of laying out a long wire isolated from and parallel to a ground grid and observe the inductively coupled AC power found on the wire. The amount of power taken from the long lines is limited; however, by using the captured power to drive CMOS devices, these devices can run indefinitely. For example, the timer circuit of FIG. 2 only requires less than 0.8 microamps at three volts for continuous operation. This amount of power can easily be captured by long lines even at great distances from an active power grid.

Circuitry found in FIG. 2 is of the CMOS variety such that very little quiescent current drain is required to maintain the circuitry in an active state. Oscillator 110 is a free running type of low frequency easily implemented by those skilled in the art. Since the timing of the present circuit is of a long duration and non-exact type, a simple RC time constant may be used to effect the frequency of the oscillator. Oscillator 110 drives counter/divider 111. This counter is in the preferred embodiment two cascaded CMOS 4040 counters available through RCA Electronics and other vendors. Each of the 4040 timers is an off-the-shelf variety of a twelve bit, divide-down counter. By cascading two of these counters it is possible to get a divide by twenty-four counter than when combined with a low frequency oscillator may produce timing sequences that may be many months long. Each of the bits of each twelve bit counter is brought out and can be used to select different timing sequences. In counter 111, outputs A, B and C are chosen to be selected bits along the divide-by-chain so that output pulses are obtained at various points in a very long time sequence. For example, output A is selected to produce a pulse once every (approximately) thirty minutes. Output B is selected to produce an output pulse once every few days and output C is selected to produce an output pulse once every twenty days. By selecting different output lines along the divide-by chain of the 4040 counters, different timing sequences can be obtained. External switch 112 is used to select the call in period of the remote sensing device. In its normal operating mode, the external switch is positioned to select an output pulse once every twenty days (output C from counter 111) to be used as the clocking input to flip-flop 113. This is the normal operating position of the switch. The second position of external switch 112 corresponds to a shorter period of duration from counter 111 corresponding to the service position of the switch. In this position, the remote sensing device would be configured to call for service. When external switch 112 is selecting output B, a clocking pulse to flip-flop 113 would be received within fourteen hours. It will be appreciated by those skilled in the art that by selecting any one of the number of output lines from counter 111, one may be able to select a call in period for service from anywhere from a few seconds to many days.

Flip-flop 113 and logical AND gate 114 are used to control the line connect relay 201 in FIG. 1. The A output of counter 111 is ANDed with the Q output of flip-flop 113 to derive the signal to instruct the other part of the circuit to connect to the telephone line for calling the central office. The A output of counter 111 is programmed to generate a pulse once every thirty minutes while the Q output of flip-flop 113 will only generate a pulse when the clock input receives a pulse. The pulse that the clock input receives is selectable through external switch 112 which in the preferred embodiment may be once every twenty days or once in fourteen hours. Thus in the normal operation, the long duration timer circuit of FIG. 2 instructs the remote sensing dialer to call the central office once every twenty days unless service is required. When service is required, the long duration timer will instruct the dialer to call the central office within fourteen hours. AND gate 114 is isolated from the line connect circuitry through capacitor 115. This allows FET 120 to turn on for a fixed time period since when capacitor 115 is charged, FET 120 will not stay "on". This prevents a component failure in the timing circuit from disabling the phone line by remaining "on hook". Capacitor 115 is, in the preferred embodiment, 10 microfarads or more to ensure the output of AND gate 114 can be held active for some time. The FET 120 further isolates the long duration timer circuit from the rest of the remote utility sensor.

The long duration timer has two inputs that are used to reset the state of the timer. The RESET input is used to reset the entire circuit for an additional twenty day or fourteen hour cycle and is inputted through capacitor 116 to isolate the circuit as previously described. The REDIAL input through capacitor 117 is used to reset the counter to begin counting a thirty minute redial cycle. The redial cycle is necessary when the remote utility sensor was unable to contact the central site or upon contact, the central site did not acknowledge.

Referring once again to FIG. 1, the interaction between the long duration timer and the rest of the circuit will now be described. Long duration timer 101 is effectively isolated from the rest of the circuit through by-pass capacitors as was seen in FIG. 2. Long duration timer 101 receives its power by capacitively coupling to the telephone lines to remove inductively coupled AC power from the line. A power supply 202 is also connected to the telephone line and is used to power the rest of the circuit. Power supply 202 is a medium power, low-drain power supply which contains several large capacitors to store power derived directly from the telephone line for powering the line-connect relay 201 portions of the circuit. FCC rules (part 68) limit the amount of current that can be taken from the telephone lines so power supply 202 contains current limiting means to draw a minimum amount of power from the telephone lines. The power supply then stores this energy in large capacitors for later higher current drain usage when the circuit is activated to activate relay 201. When relay 201 is activated, the rest of the circuitry and power supply 202 (through diode 220) is powered directly from the telephone line.

Line connect relay 201 is implemented using optical couplers to connect the telephone line to the telephone transceiver 203. It will be appreciated by those in the art that the line connect relay 201 may be implemented using various mechanical, electromechanical and optical coupling relay means. When long duration timer 101 activates line connect relay 201, the power is then supplied by the phone line for the remainder of the circuit and a power-up reset is performed on counter 210 to place it in an initial all-zeroes state. Should the phone line be "dead", supply 202 would not have any power and therefore the line could not be picked up but the counter 101 would continue to operate. Telephone transceiver 203 performs all of the necessary line termination and communication functions of a normal telephone transceiver and is implemented in the preferred embodiment using a single chip telephone speech circuit manufactured and sold by National Semiconductor Corporation (No. TP5700A). This single chip circuit replaces the hybrid transformer, compensation circuitry and side tone networks required for attaching and communicating through standard telephone lines. It will be appreciated by those skilled in the art that this type of transceiver circuitry can be implemented in the circuitry of the present invention. Telephone transceiver circuit 203 receives signals from the telephone line and passes them off to delay circuit 216 and tone detect circuit 204 and receives signals from DTMF transmitter 205 to transmit on the telephone line. DTMF transmitter 205 is used to transmit the telephone number of the central site and also to transmit coded information to the central site. It will be appreciated by those skilled in the art that an optional pulse dialer 206 may be used to dial the telephone lines on traditional pulse dial networks. However, some form of DTMF transmitter or other modem is required to transmit data over a pulse dial line after the number has been dialed and the site is connected. DTMF transmitter 205 is implemented in the preferred embodiment using a single chip DTMF generator for binary data produced by National Semiconductor Corporation (No. TP5088). Those skilled in the art will readily recognize that this chip may be easily incorporated into the present invention.

The delay circuit 216 incorporates within it a delay function such that any tone received from telephone transceiver 203 will cause an active output from tone detect circuit 204 to be held and transmitted to state machine circuit 207. The output from delay circuit 216 will be held active for a period of time after the tone received from telephone transceiver 203 stops. The delay duration for the delay circuit 216 is selected in the preferred embodiment using an RC delay circuit with a duration of approximately eight seconds. An alternate delay technique would be to use a counter for delay circuit 216.

State machine 207 is used to control the sequence of events and operations to control the remote sensing dialer when it calls to the central site. State machine 207 serves to reset long duration counter 101 and control oscillator 208. State machine 207 receives inputs from 4-to-10 line decoder 209 and counter 210. Oscillator 208 is used to cause counter 210 to count up which in turns drives 4-to-10 line decoder 209 to sequentially count out the digits of the telephone number and the address of the remote sensing dialer. As counter 210 counts up, the outputs cause 4-to-10 line decoder 209 to sequentially output a signal from pins one, two, three, etc. on through ten. 4-to-10 line decoder in the preferred embodiment is implemented using a commonly available CMOS 7442 integrated circuit manufactured by National Semiconductor Corporation and other vendors. The decoder 209 is used to drive a series of switches which in the preferred embodiment are implemented using DIP rocker switches which in turn drive the DTMF transmitter. The diodes 211 are used in conjunction with the DIP switches to form a data bus the values of which are selected by the positions of the switches 212 and the values on the outputs of decoder 209. An alternate technique that could be used in place of the DIP switches would be to use PLAs or PROMs may be used which would allow one-time factory setting of the phone number and address.

The operation of the circuit in FIG. 1 will now be described. Long duration counter, deriving its power from the inductively coupled AC voltage found on telephone lines counts out in its normal operation, for twenty days. At the end of the twenty day period, long duration counter 101 causes the line connect relay 201 to connect telephone transceiver 203 to the tip and ring wires of the telephone line. Power supply 202 is used to power the line connect circuit until the line connect is completed. Power is then supplied from the phone line directly. Tone detect circuit 204 receives the dial tone from delay circuit 216 and telephone transceiver 203 and causes a signal to be transmitted to state machine 207. State machine 207 enables oscillator 208 to cause counter 210 to start counting up. The first value presented by counter 210 to decoder 209 is a 0000 value corresponding to the DCBA inputs of counter 209. This value corresponds to output pin 1 on decoder 209 corresponding to the first digit of the telephone number to be dialed. The least significant bit (LSB) of counter 210 is used as an enable input 213 to DTMF transmitter 205. The frequency of oscillator 208 and the counting rate of counter 210 are selected such that the LSB of counter 210 is active for approximately 200 milliseconds causing a short DTMF tone to be transmitted. Counter 210 in the preferred embodiment is a 4040 CMOS 12-bit counter chip available from RCA Electronics and other vendors.

Enable input 213 on DTMF transmitter 205 causes the first telephone digit to be transmitted out telephone transceiver 203 and onto the tip and ring wires of the telephone line. The input to DTMF transmitter 205 is a four bit binary code to select the tones for the telephone number to be dialed. DIP switches 212 are used to select the binary code corresponding to the first digit of the telephone number dialed. State machine 207 continues to enable oscillator 208 which causes counter 210 to continue counting up. The next value presented to decoder 209 by counter 210 would be the 0001 value on the DCBA inputs, respectively. This would cause digit number two out of pin 2 of decoder 209 to become enabled, thereby transmitting the second encoded telephone number to DTMF transmitter 205. Thus the second digit of the telephone number is transmitted through telephone transceiver 203 to the telephone line. In a like fashion each of the successive digits of the seven digit telephone number are transmitted through DTMF transmitter 205 and telephone transceiver 203 to the telephone line.

When counter 210 reaches to 0111 corresponding to the DCBA inputs on decoder 209, output pin 8 is enabled which causes a feedback signal to be sent to state machine 207 which in turn disables oscillator 208 to stop the count. At this point in the sequence, the seven digit telephone number has been transmitted to the telephone line and the remote utility sensor is awaiting a response. Also at this point, tone detect circuit 204 is monitoring the telephone line for a ringback tone or a busy signal. Due to the inherent delay in circuit 216, each time a ringback signal is received from the telephone line, the output from tone detect 204 is kept active. The delay circuit 216 is intended to keep the output active even during the quiet intervals during ringback signals. In a like fashion, if a busy signal is received, tone detect circuit 204 will maintain an active signal transmitted to state machine 207. State machine 207 during this juncture is waiting for the tone to stop indicating that the telephone line has been answered. If the telephone line does not answer, the state machine, after an appropriate delay, will send a command to the long duration timer on the REDIAL input for it to redial the telephone number at a later time. The long duration timer then disconnects line connect relay 201 and the entire circuit (except for the long duration timer) is powered down.

If the telephone line is answered on the central site end, tone detect circuit 204, after the appropriate delay (a minimum of two seconds is required by FCC Part 68) of delay circuit 216, will drop the tone detect line to state machine 207. State machine 207 will then determine that the telephone line has been answered and that the receiving site is waiting to receive information. State machine 207 will then re-enable oscillator 208 to begin counting up once again. Counter 210 has been previously positioned at count 0111, corresponding to the DCBA inputs respectively, on 4-to-10 line decoder 209 such that output pin 8 corresponding to the first position of the address is enabled. The next count will cause the least significant bit (LSB) on the output of counter 210 to enable DTMF transmitter 205. This will cause the first address bit to be transmitted via the telephone transceiver 203 onto the telephone line.

In the first preferred embodiment, external switch 112 is a two-ganged switch connected to a water softener such that the first gang is used to control the time interval between calls and the second gang of the switch is used to invert the first bit of the address. As shown in FIG. 1, switch 112 controls the first bit of address one. The purpose of this is to effectively invert the first bit of the address to indicate to the central site the service is required. This is to distinguish between the normal periodic reporting of the remote site and a call for service from the remote site. As counter 210 continues to count up the second and third bits of the address from 4-to-10 line decoder 209 are transmitted through DTMF transmitter 205 to the telephone line. With three address bits and each address bit being represented by one of sixteen possible DTMF tones, 4096 addresses can be uniquely assigned. With one bit of the address reserved for service request, 2048 unique addresses are available.

After the third address is transmitted to the telephone line, the counter continues to count up. However, the values presented on the DCBA inputs to 4-to-10 line decoder 209 are considered by that chip to be illegal addresses and therefore do not cause any change in the outputs on pins 1 through 10. The counter will continue to count up until the most significant bit (MSB) of the counter becomes active causing the state machine to once again stop the oscillator and wait for a tone. At this point, all of the address information has been transmitted to the central site and the remote utility sensor waits for an acknowledgement tone to reset the long duration counter. If the acknowledgement tone is not received in a preselected amount of time, the state machine sends a signal once again to the long duration counter to redial the number at a later time. The long duration counter would then disconnect the telephone line and reset the circuits to be redialed in thirty minutes. If the confirmation tone is received from the central site, the state machine once again re-enables the oscillator to continue counting. As the counter counts up and the most significant bit (MSB) and the A output of the counter both become active, a master reset is performed on the long duration counter. This master reset resets flip-flop 113 shown in FIG. 2 so that the thirty minute redial is disabled and the counter will only cause a redial at the next appropriate time. If the external switch 112 is still in the service position, the remote sensing dialer will automatically redial and retransmit the information in fourteen hours.

Figure 3:
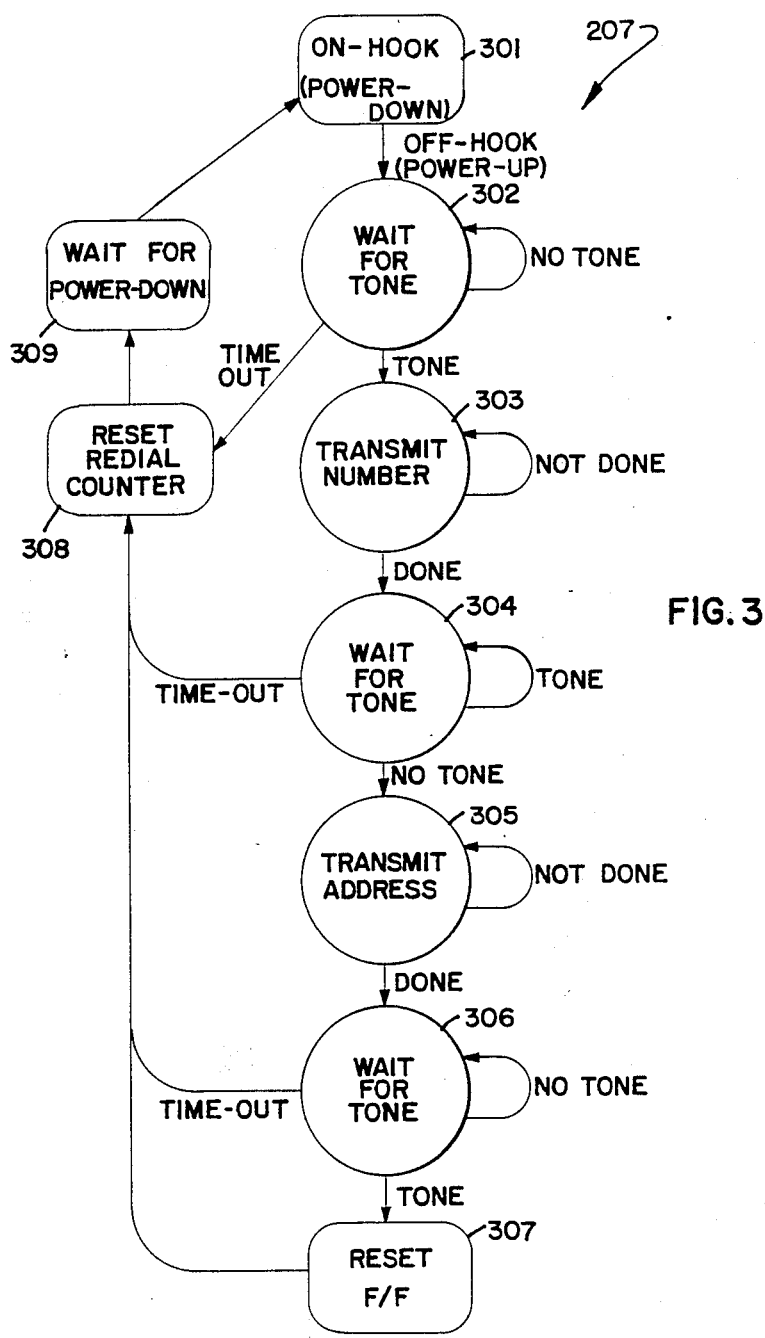
FIG. 3 is a state diagram for the state machine of FIG. 1.

The operation of the circuit is best described in terms of the state diagram shown in FIG. 3. The normal idle state of the remote sensing dialer is in the power down or on-hook situation indicated by the block labeled 301. The long duration counter begins the sequence of events by causing the line connect relay to connect the telephone circuits to the telephone line and also to power up the circuits. This situation moves the state machine into state 302 in which the state machine waits for a dial tone. Inherent in the design of the state machine is a time-out timer to insure that the device does not remain stuck in one position. The time-out timer is always timing and should the remote utility sensor circuits fail to perform or complete the cycle, the time out mechanism will reset the redial counter in box 308 and wait for the timer to power down the unit in box 309. The state machine waiting for the dial tone in state 302 moves to state 303 when the dial tone is received. In this state, the state machine enables the oscillator 208 to begin counting counter 210 for transmitting the seven digit telephone number through decoder 209 and DTMF transmitter 205. The state machine continues to wait until the transmission of the number is complete. The state machine recognizes when the telephone number has been transmitted by the signal received from pin 8 of decoder 209. When the number has been transmitted, the state machine moves to state 304 and waits for the tone detect circuit to detect the absence of any tones. The tone detect circuit will continue to indicate tones after an appropriate amount of delay which corresponds to either a ringback tone or a busy tone. If a busy tone or a ringback tone is received, the timing mechanism in the state machine will cause the circuit to time out and move on to state 308 where the long duration counter is instructed to redial in thirty minutes. If the telephone number at the central site is answered, the tone detect circuit will indicate no tone and the state machine will move on to state 305. At this point, the state machine will transmit the address of the remote utility sensor by enabling oscillator 208 to once again step through the address digits. Once the address digits are transmitted, the most significant bit (MSB) of counter 210 instructs the state machine that the address has been transmitted properly. This signal will instruct the state machine to move on to state 306 and wait for the hand shake or acknowledgement tone. If no tone is received and the device times out, the state machine instructs the long duration counter to redial the number in thirty minutes and the system is powered down. However, if an acknowledgement tone is received from the central site, the state machine moves to state 307 and resets the long duration timer flip-flop 113 so that redial will occur at the next longer interval.

Figure 4:
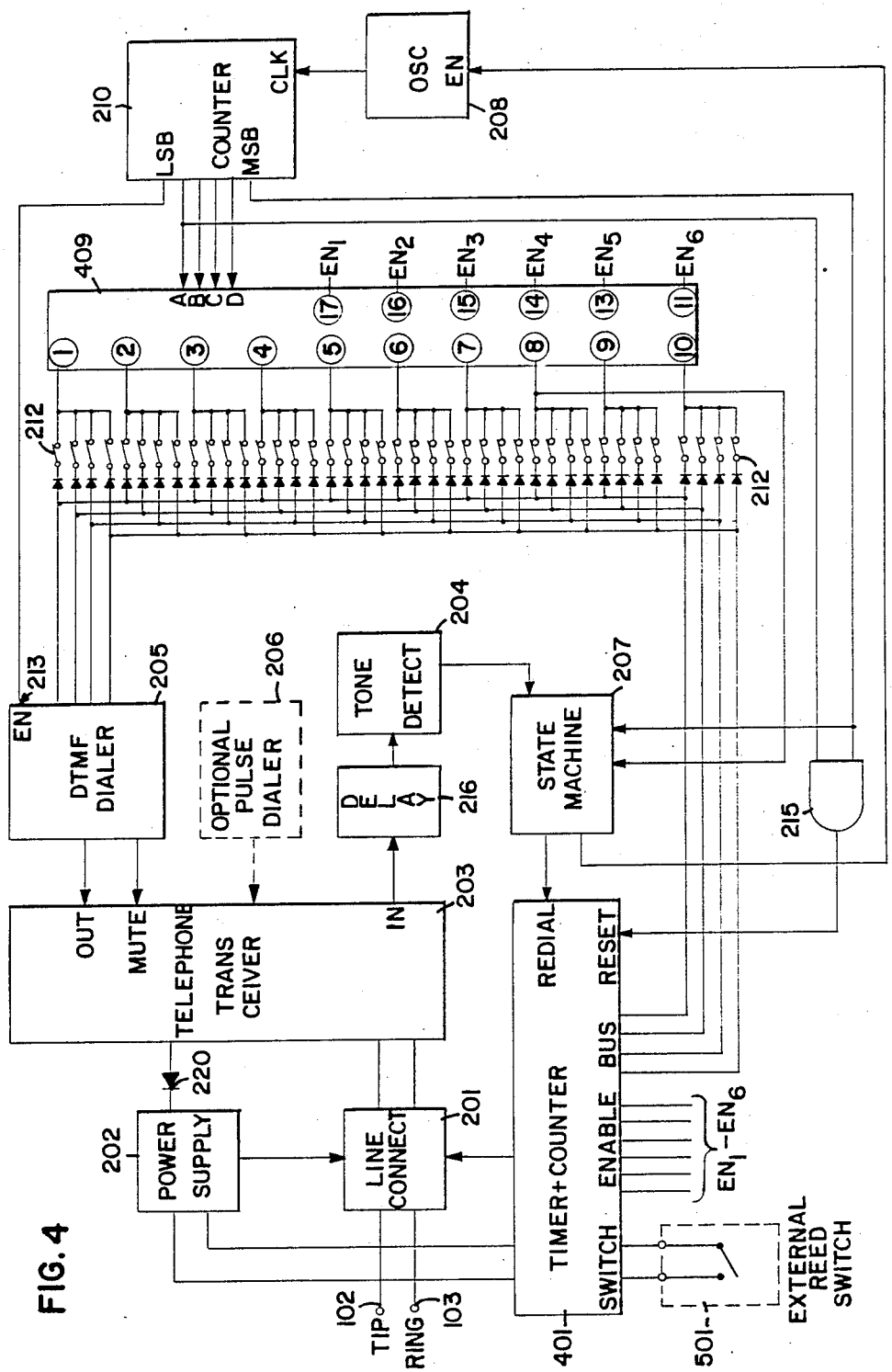
FIG. 4 is a block diagram of the second preferred embodiment of the present invention.
Figure 5:
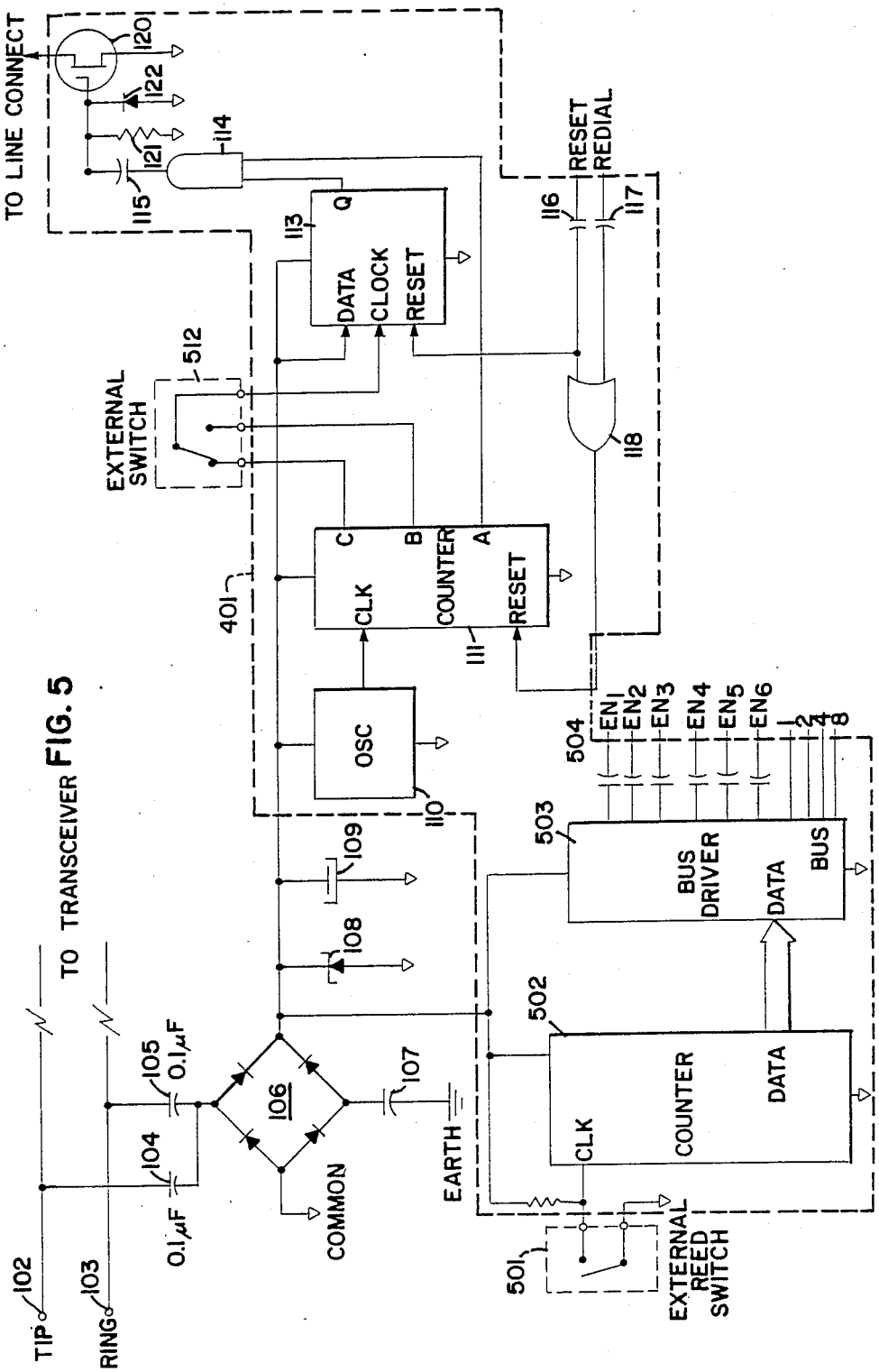
FIG. 5 is a detailed schematic diagram of the timer and counter for the second preferred embodiment for the invention disclosed in FIG. 4.

FIGS. 4 and 5 show the second preferred embodiment of the present invention. In this embodiment, the circuit has been tailored to be used in monitoring a utility meter and transmitting the values found on the utility meter to the central site. In FIG. 5, the long duration counter has been modified to include an additional counter 502 to count the utility usage. Although many forms of counting could be implemented with the present invention, the preferred embodiment shown in FIG. 5, includes an external reed switch 501 which is designed to be activated by a permanent magnet placed on a rotating wheel within a utility meter. The utility meters that could include such a mechanism would be, for example, electric meters, gas meters, water meters and the like. The opening and closing of the external read switch will cause counter 502 to count up. Counter 502 in the preferred embodiment is constructed using two 4040 twelve bit CMOS counters cascaded in series. The output of each bit in these counters is wired to a group of tri-state bus driver chips 503 available from National Semiconductor Corporation (part no. MM80C95). These bus driver chips are designed to multiplex the various values in the counter onto the data bus used to drive the DTMF dialer. The inputs to the bus driver chips include the enable lines to selectively enable the group of output bits to be transmitted to the central site via the DTMF dialer. The bus enable signals are received from 4-to-16 line decoder 409 in FIG. 4. The enable signals are isolated from the rest of the circuit by capacitors 504. The counter chips 502 and bus drivers 503 are electrically powered by the same power source that is used to power the long duration timer as was previously described.

Referring once again to FIG. 4, the operation of this circuit is identical to the operation of the first preferred embodiment except that the remote utility sensor will also transmit the values contained in the utility counter 502. The long duration counter 401 causes the line connect relay 201 to connect to the telephone line and begin the operations of the reporting in to the central office. The circuit operates in the same way to transmit the seven digit telephone number through the DTMF dialer to the telephone transceiver onto the telephone line. As was previously mentioned, an optional pulse dialer could be used in pulse dial networks and in that case the DTMF dialer could be replaced by a standard modem to transmit the information. After the telephone number has been transmitted and a silent period is detected by tone detector 204, the address of the remote sensing dialer is transmitted to the central site along with the values contained in the utility counter 502 by sequentially enabling the bus drivers 503. This is accomplished in the same manner in which the telephone digits and the address were transmitted in the sequence. The counter 210 is stepped through an address which selectively and sequentially enables pins 17, 16, 15, 14, 13, and 11 to transmit the DTMF tone corresponding to the values contained in counter 502. A 4-to-16 line decoder 409 is used in place of the 4-to-10 line decoder 209 to provide for the additional enabling signals required to transmit the six bit code of tones. In the preferred embodiment, decoder 409 is implemented using a standard CMOS 74154 4-to-16 line decoder chip available through various vendors including National Semiconductor Corporation.

Once the three bit address code and the six bit data code has been transmitted through DTMF dialer 205 through the telephone line, the dialer circuits wait for an acknowledgement tone to be received from the central site. If the acknowledgement tone is not received, the state machine times out and instructs the timer to redial at a later time. If the acknowledgement tone is received, the counter 210 is once again enabled by state machine 207 to continue counting up. When the most significant bit (MSB) and the A line both become active, a reset signal is sent to the timer and counter 401 instructing it to redial again in twenty days. As an additional function, the present invention could be modified such that the reset signal is used to generate a tone out of the DTMF transmitter. This additional tone is "read" by the central site confirming that a reset has been accomplished.

Figure 6:
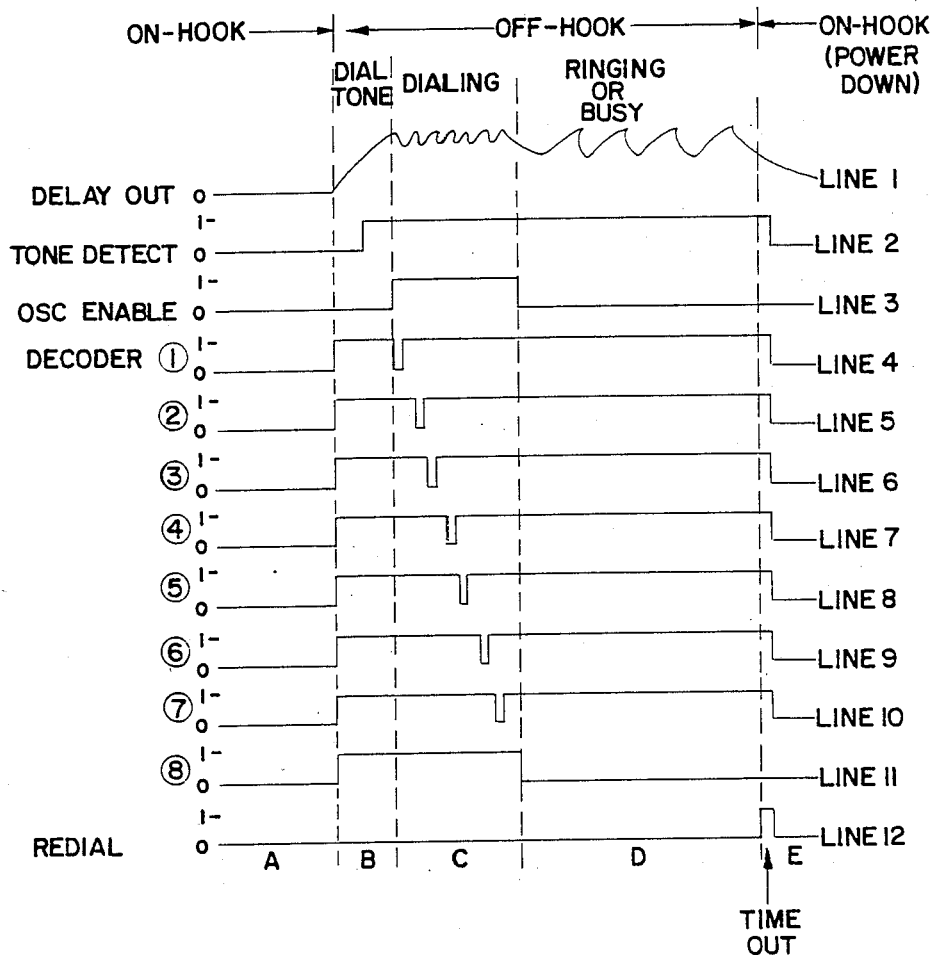
FIGS. 6 and 7 are detailed timing diagrams of the preferred embodiment disclosed in FIG. 1.
Figure 7:
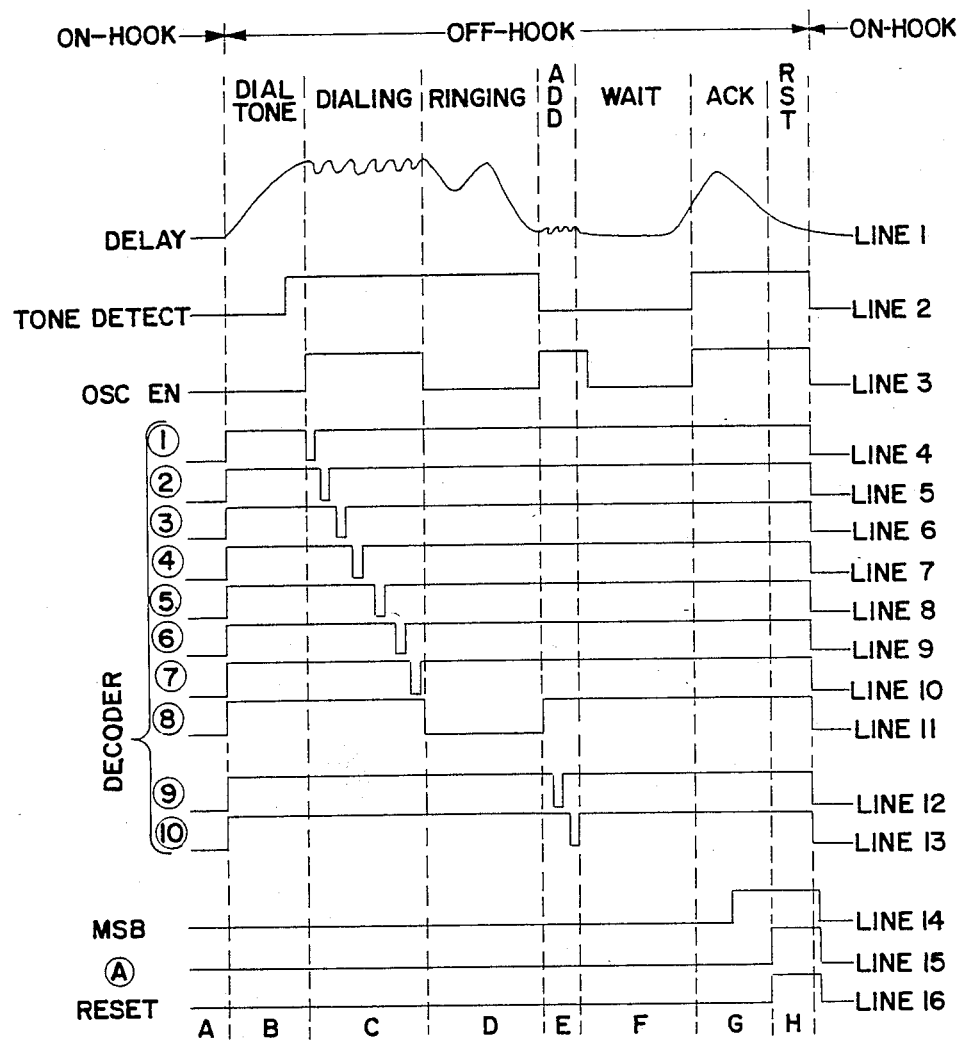
Figure 8:
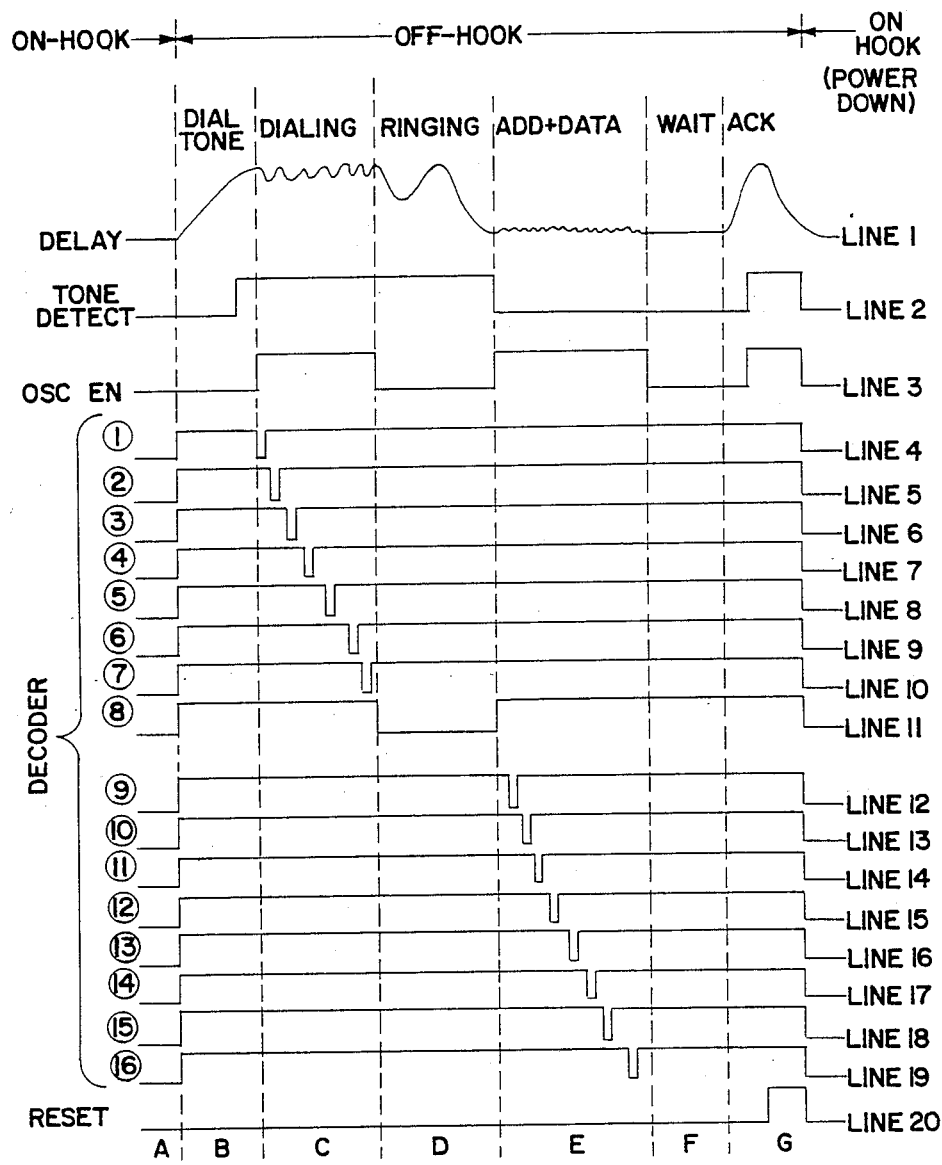
FIG. 8 is a detailed timing diagram of the preferred embodiment disclosed in FIG. 4.

FIGS. 6 through 8 are timing diagrams corresponding to the operation of the circuits. FIGS. 6 and 7 correspond to the first preferred embodiment shown in FIG. 1 and FIG. 8 corresponds to the operation of the circuit of the second preferred embodiment shown in FIG. 4. For the convenience of the reader, the signal lines are numbered on the right and the major sequences are lettered across the bottom.

FIG. 6 shows the timing sequences of the signals for the circuit of FIG. 1. Line 1 corresponds to the output of the delay circuit 216, line 2 corresponds to the output from tone detect circuit 204, line 3 corresponds to the oscillator enable input to the oscillator 208 from state machine 207 and lines 4–11 correspond to decoder outputs 1–8. The redial input to the long duration counter 101 is shown in line 12 of FIG. 6. During sequence A of the timing diagram, the circuit is inactive and powered down. This corresponds to an on-hook condition where line connect relay 201 does not have the telephone line connected to telephone transceiver 203. When long duration timer 101 instructs line connect relay 201 to connect the telephone line to telephone transceiver 203, the dial tone is normally received by delay circuit 216. The output of delay circuit 216 is shown in line 1 of FIG. 6. The dial tone causes the delay circuit to produce a delayed active signal which is passed to tone detect circuit 204. The output of tone detect circuit 204 is shown in line 2 of FIG. 6 and the output becomes active when the dial tone causes the delay circuit output to reach a certain threshhold. After an appropriate amount of delay, state machine 207 causes oscillator 208 to begin oscillating by sending a signal on the oscillator enable signal shown in line 3 of FIG. 6. This oscillator enable signal is sourced from state machine 207. When oscillator 208 is enabled, it being clocking counter 210 which causes 4-to-10 line decoder 209 to sequentially output signals on the output pins. Output pins 1–8 on decoder 209 correspond to lines 4–11 in FIG. 6. It can be seen in FIG. 6 that as the oscillator is active, decoder outputs 1–8 sequentially produce negative going pulses to DTMF transmitter 205. Each one of these pulses will cause the encoded telephone digit to be transmitted to DTMF transmitter 205 for dialing the telephone number of the central office. While DTMF transmitter 205 is transmitting the tone digits, a MUTE signal is sent to telephone transmitter 203 such that the tones are substantially muted to delay circuit 216 and tone detect circuit 204. Since the tone digits are transmitted in such a rapid fashion, delay circuit 216 does not respond to the muted tones and its output remains high due to the previous presence of the dial tone received before dialing. When output pin 8 from 4-to-10 line decoder 209 is brought low, it sends a signal to state machine 207 to stop counting and state machine 207 inhibits oscillator 208 by dropping the oscillator enable signal as shown in line 3, sequence D of FIG. 6. The dial tone sequence of the events described herein correspond to sequence B in FIG. 6. The dialing of the central site telephone number corresponds to sequence C of FIG. 6. After the telephone number has been dialed, the remote utility sensor circuitry monitors the telephone line for an answer from the central site. This corresponds to sequence D of FIG. 6. If the phone number continues to ring without being answered, or if a busy signal is detected on the line, state machine 207 will time out and cause a redial command to be sent to long duration timer 101. This redial command, shown in sequence E on line 12, causes the long duration timer to disconnect the circuits from the telephone line by dropping the signal to line connect relay 201. When line connect relay 201 disconnects, the entire circuit goes on-hook and is powered down, as shown in sequence E of FIG. 6.

FIG. 7 corresponds to the operation of the circuits in FIG. 1 when a normal answer is received from the central site. Line 1 corresponds to the output from delay circuit 216, line 2 corresponds to the output from tone detect circuit 204, line 3 corresponds to the oscillator enable input to oscillator 208, lines 4–13 correspond to pins 1–10 on decoder 209, line 14 corresponds to the most significant bit (MSB) output on counter 210, line 15 corresponds to the A input to decoder 209 and line 16 corresponds to the reset input to long duration counter 101. The sequence of events is similar to that described in FIG. 7 in that sequence A corresponds to the on-hook or powered down condition. Sequence B corresponds to receiving a dial tone from the telephone line and activating the tone detect circuit 204 from delay circuit 216. Sequence C corresponds to the enabling of oscillator 208 which causes the decoder to sequentially drop output lines 1–7 corresponding to the seven digit telephone number. As shown in line 11 of sequence C, output pin 8 of decoder 209 drops after the seventh digit has been dialed of the telephone number of the central office. The lowering of pin 8 on decoder 209 sends a signal to state machine 207 to disable the oscillator which is shown at the beginning of sequence D on line 3. During sequence D, the circuit is idle and is waiting for the absence of a tone. During this time the telephone line may be ringing and the end of sequence D corresponds to the telephone ringback signal stopping and the telephone at the central site being answered. When no tone exists on the telephone line, delay gate 216 slowly drops its signal as shown in sequence D of line 1 and tone detect circuit 204 lowers its line in response thereto. This is shown at the end of sequence D on line 2. The lowering of the output from tone detect circuit 204 causes state machine 207 to once again enable oscillator 208 to begin transmitting the address of the remote utility sensor. The address lines are found at pins 8–10 of decoder 209 and correspond to lines 11–13 of FIG. 7. As was previously described, the least significant bit (LSB) of counter 210 is used to enable DTMF transmitter 205 such that each digit of the telephone number and the address is only transmitted for 200 milliseconds. As the address tones are transmitted by DTMF transmitter 205, the MUTE signal is sent to telephone transceiver 203 which substantially mutes the tones received by delay circuit 216 and tone detect circuit 204. Since the address data is transmitted at such a rapid pace, and the tones are muted, the delay circuit output cannot respond and the output remains low, as shown on line 1, sequence E of FIG. 7. Once the address of the remote utility sensor is transmitted to the central site, the remote utility sensor waits for an acknowledgement of the data transmitted. This corresponds to sequence F of FIG. 7. After the address has been transmitted, delay gate 216 stays low, as shown in line 1 of FIG. 7. At this point, the remote utility sensor circuits are waiting for an acknowledgement tone from the central site. The acknowledgement tone is shown in sequence G of FIG. 7 whereby the tone is received by delay gate 216 shown on line 1 of FIG. 7 which causes the tone detect circuit output to become active as shown in line 2 of FIG. 7. Tone detect circuit 204 causes state machine 207 to enable oscillator 208 as shown in line 3 of FIG. 7. Once the oscillator is enabled, the counter 210 continues to count up until the most significant bit (MSB) of counter 210 and input A of decoder 209 both become active as shown in lines 14 and 15 of FIG. 7, respectively. When these two lines become active, AND gate 215 sends a reset signal to long duration counter 101 and instructs it that the data has been acknowledged. The reset signal is shown in line 16 of FIG. 7. This would complete the cycle corresponding to a normal answer and receipt of data from the remote utility sensor. The long duration counter, upon receiving a reset signal, will not redial the central site number for another twenty days, or whichever time period has been programmed. Should the acknowledgement tone not be received, the long duration timer will not be reset and the system will redial in the short timer period (30 minutes).

FIG. 8 is a timing diagram showing the sequence of events for the second preferred embodiment of the present invention shown in FIG. 4. FIG. 4 operates very similarly to the device in FIG. 1 except that in addition to the three address tones that are transmitted over the telephone line, six data tones are also transmitted. Sequence A of FIG. 8 corresponds to the normal idle state where the circuit is powered down and the line connect relay 201 does not connect telephone transceiver 203 to the telephone line. In this condition all power is removed from the rest of the circuit except for the timer and the counter 401. When timer 401 counts out the selected period of time for calling the central office, it sends a signal to line connect relay 201 to activate the circuit. This corresponds to the beginning of sequence B of FIG. 8. When telephone transceiver 203 is connected through line connect relay 201 to the telephone lines, a dial tone is normally heard. If no dial tone is received, the time out feature embodied in the state machine 207 will cause the state machine to instruct timer 401 to redial the number in thirty minutes. Upon this condition, the timer will drop the enable line to line connect relay 201 and cause the circuit to return to an idle state. When a dial tone is received, the signal is passed to delay circuit 216 and on to tone detect circuit 204. The output of delay circuit 216 is shown in line 1 of FIG. 8. In sequence B, it can be seen that the dial tone causes the delay circuit to raise the output line which in turn causes the output from tone detect circuit 204 to raise its output line, as is seen in line 2 of FIG. 8 during sequence B. After an appropriate amount of delay, in response to the active tone detect signal from tone detect circuit 204, will raise the oscillator enable signal as shown in the end of sequence B on line 3 of FIG. 8. When the oscillator enable signal becomes active, oscillator 208 will begin to oscillate causing counter 210 to count up. Counter 210 sequentially causes the outputs of 4-to-16 line decoder 209 to sequentially become active. The decoder outputs 1-16 are shown on lines 4-19 in FIG. 8. Sequence C of FIG. 8 corresponds to the transmission of the telephone number of the central site. Output pins 1-8 on decoder 409 sequentially are lowered causing DTMF transmitter to transmit the encoded digits that were programmed by switches 212. When pin 8 of decoder 409 lowers its output as shown in the beginning of sequence D of line 11, the state machine lowers the oscillator enable signal to stop counter 210 from counting. During sequence D of FIG. 8, the circuit is waiting for a ring signal and an answer at the local site. The end of sequence D in FIG. 8 corresponds to the telephone being answered and the ringback signal stopping. When the output of delay circuit 216 decays to an appropriate level, tone detect circuit 204 drops its output signal as shown at the end of sequence D on line 2. The lowering of the tone detect output causes state machine 207 to once again enable oscillator 208 as shown in the beginning of sequence E on line 3 of FIG. 8. This point in time corresponds to the proper connection of the remote utility sensor to the central site and the readiness of the central site to receive the address and data information from the remote utility sensor. Sequence E of FIG. 8 corresponds to the transmission of the address and data from the remote utility sensor. As oscillator 208 is enabled, counter 210 continues to count up causing the outputs of decoder 409 to sequentially become active. The least significant bit (LSB) of counter 210 is used to alternately enable and disable DTMF dialer 205 as the corresponding digits become available on its input for transmission to the telephone line. The MUTE input from DTMF transmitter 205 to telephone transceiver 203 causes a muting of the transmitted tones as received by delay circuit 216 and tone detect circuit 204. The rapid transmission of the address and data do not affect the tone detect circuit so its output remains low, as seen in sequence E on line 2 of FIG. 8.

When the most significant bit (MSB) of counter 210 becomes active, it sends a signal to state machine 207 to once again stop the oscillator. This corresponds to the beginning of sequence F in FIG. 8 where the oscillator enable signal is dropped in line 3. During this period of time the remote utility sensor is waiting for an acknowledgement signal from the central site. If no acknowledgement signal is received, the time-out mechanism of state machine 207 will send a signal to timer 401 to redial in thirty minutes. Sequence G of FIG. 8 corresponds to the receipt of an acknowledgement tone from the central site. This acknowledgement tone will cause tone detect circuit 205 to activate its output line as shown in line 2 of FIG. 8. This will cause the state machine 207 to activate once again the oscillator enable signal shown in line 3 of FIG. 8. When the oscillator 208 begins oscillating once again, the counter 210 counts up until both the most significant bit (MSB) and the D input to 409 both become active at the same time. When this happens, the reset signal to timer 401 is activated as shown in line 20 of FIG. 8. A reset signal on the timer 401 indicates to the timer that the data has properly been acknowledged by the central site and that the next data transmission need not take place for another twenty days.

Figure 9:
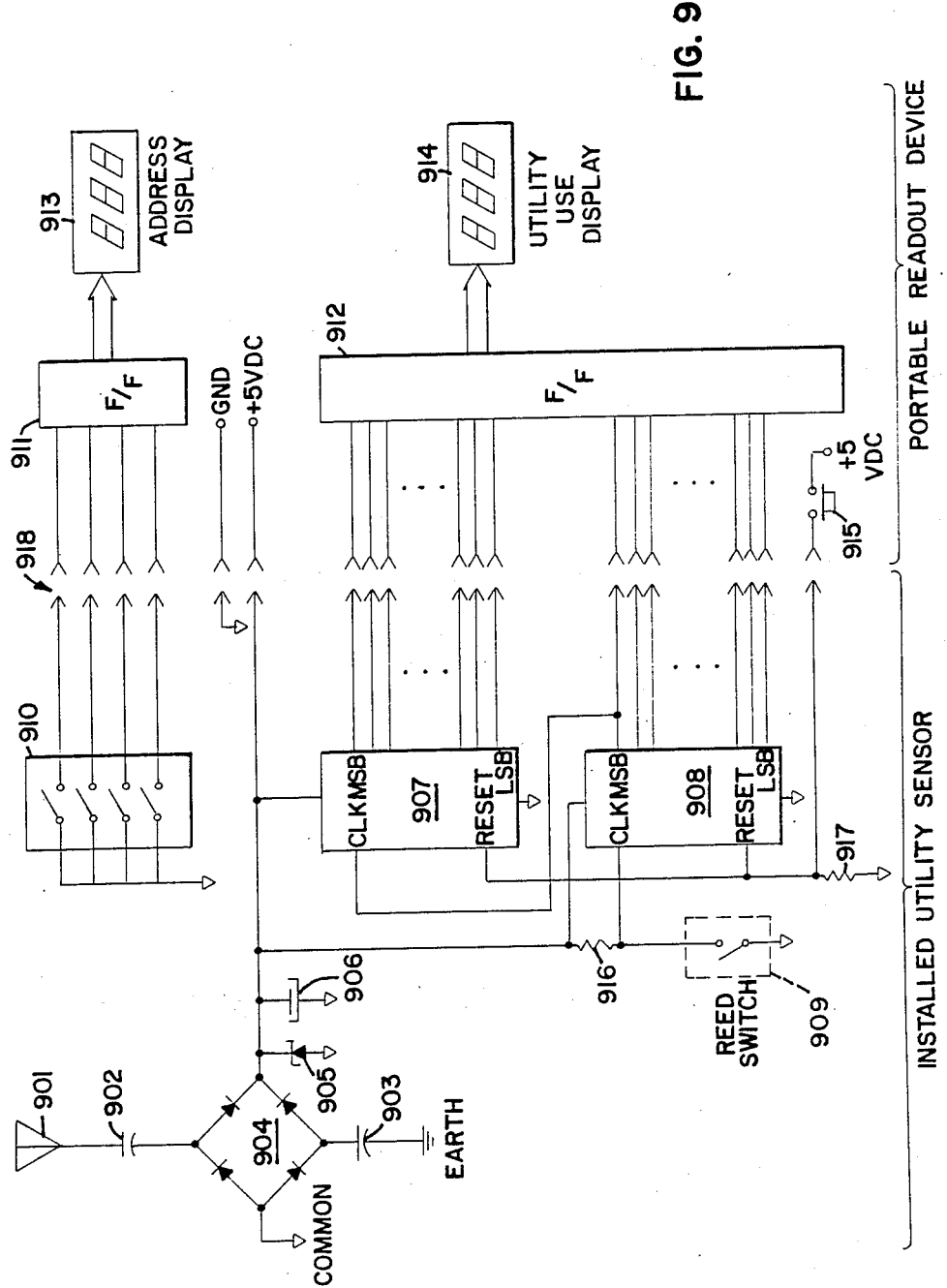
FIG. 9 is a block diagram of the third preferred embodiment of the present invention.

FIG. 9 describes an alternate use of the low-powered utility sensor. In this embodiment, the remote utility sensor is once again powered by a long line in the form of an antenna by capacitive coupling to a telephone line to remove inductively coupled AC power from the power grid environment. This power taken from the power grid is then used to drive CMOS circuitry to maintain a perpetual counter for utility use accounting. FIG. 9 shows the utility sensor as being adapted to record and transmit to a remote location utility usage.

The dialer portion of FIGS. 1 and 4 has been replaced with a plug interface which can be remotely located, for example on the outside of the customer's house. This plug interface then can be manually connected to a portable readout device which can be used to display or store the amount of utility usage. The object and advantage of this embodiment is that telephone lines need not be used to transmit data to a central site. Utility meters can still be read from outside the customer's home, and the internal utility meters still maintain a permanent record of utility usage using mechanical measuring means.

FIG. 9 is divided into two parts. On the left, the installed utility sensor is described which is used to record utility usage and is powered by long lines such as telephone lines. The portion of the circuit on the right is an external portable readout device which can be manually connected to a cabled interface to record and store information about the utility usage and the address of the utility meter. The low power source for powering the CMOS circuitry is implemented similarly to the implementation shown in FIGS. 2 and 5. The schematic symbol for an antenna 901 is shown which can take the form of a telephone line or any other long line which collects inductively coupled AC power from the local power grid. The inductive coupling is accomplished by the device merely being placed in proximity to an AC power grid. It will be recognized by those skilled in the art that a large AC power grid such as the type pervading the United States inductively couples AC power across wide distances and across ground planes due to the pervasive nature of AC power wiring. Diode bridge 904 is capacitively coupled between antenna 901 and earth reference. The capacitors 902, 903 are preferably 0.1 microfarad in value. Capacitive coupling may only be required for lines such as telephone lines that serve other functions. A long wire or antenna may be dedicated to capturing AC power, and it could be directly coupled to diode bridge 904. The diode bridge 904 is used to rectify the inductively coupled AC power into DC power and is stored in filter capacitor 906. Zener diode 905 is used to protect against over-voltage and to regulate the voltage level of the stored power. The value of zener diode 905 is preferably five volts and is used to regulate the voltage supplied to CMOS counter chips 907, 908.

Counter chips 907, 908 are in the preferred embodiment cascaded CMOS 4040 12-bit counter chips. The most significant bit of counter chip 908 is used to drive the clocking input of counter chip 907 such that a 24-bit counter is implemented. It will be appreciated by those skilled in the art that a greater or lesser number of counter chips or counter chips of different configurations could be used without varying from the scope or the spirit of the present invention. Reed switch 909 is used to detect the utility usage and drives the clock input to counter 908. The reed switch is opened and closed by the passing of a permanent magnet in proximity to the Reed. The permanent magnet in the preferred embodiment would be attached to the utility measurement wheel such that as the wheel rotates, the reed switch opens and closes, which in turn counts the utility usage into counter 907, 908. The outputs of counters 908 and 907 are presented to the cable interface 918 for eventual reading by the portable readout device. A jumper plug 910 is used to set the address of the local utility sensor. This jumper plug may be implemented using DIP switches, discrete switches, PLAs, PROM or other such information storage devices. The address of jumper plus 910 is also presented to cable interface 918 for eventual readout and display by the portable readout device.

The portable readout device can be of a varying amount of complexity. In the schematic shown in FIG. 9, the portable readout device is merely a self-powered display unit which is used to remotely display the values contained in the counter chips. The displayed values would then be read and manually recorded by a serviceman. An alternate portable device could be implemented using a microprocessor to store, display and analyze utility usage at the site. The portable readout device receives the five volts and ground voltage from the utility sensor, but does not use this for powering the readout device. These reference voltage points are simply used to determine the voltage bias on the various output lines of connector 918. Flip-flops 911, 912 are used to latch and store the values presented on cabled interface 918. Flip-flop 911 is implemented using a parallel grouping of flip-flops in the embodiment shown in FIG. 9 which can be used to display the address of the device. It will be appreciated by those skilled in the art that a greater or lesser number of address bits can be used to increase or decrease the number of addresses of utility sensors. The utility use display 914 is connected to flip-flops 912. The flip-flops 912 are used to latch and display the values contained in counter chips 907, 908. A reset button 915 is used by the utility service man to reset the counter chips after reading and recording the amount of utility usage.

It will be appreciated by those skilled in the art that the present invention could be attached to telephone lines and could be called from a central site to received the information stored in the utility usage registers. The essential feature of this device is that it would be immune to power interruptions on AC or telephone lines, and would not lose its count in such a situation. A dialing mechanism from a central office could call on periodic basis to a remote sensor embodying the present invention to receive the status and utility usage.

Although specific logic configurations and electrical configurations have been illustrated and described for the embodiment of the remote utility sensor set forth herein, it will be appreciated by those of ordinary skill in the art that any conventional logic or electrical arrangements which are calculated to achieve the same purpose may be substituted for the specific configurations shown. Thus, although conventionally available LSI and MSI logic is generally preferred due to its availability, the logic described herein may be implemented through the use of conventional components or it may be all combined to a greater or lesser degree in a fewer number of VLSI components. In addition, it will be readily appreciated by those of ordinary skill in the art that although positive logic inventions have here by employed, negative logic conventions may alternatively be utilized where a ONE level corresponds to a lower voltage than a ZERO level. Additionally, although specific logic components and associated conditions necessary for the operation of this system have ben mentioned in order to describe the preferred embodiment of the present invention, complementary logic configurations similar to those mentioned may alternatively be employed such as the substitution of NOR-type logic for NAND-type logic, without any deviation from the concepts of the invention disclosed.

While the present invention has been described in connection with a preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A remote transmitting device for connection to a telephone line, comprising:
   number transmitting means for transmitting coded numbers;
   telephone line connection means for interconnecting said number transmitting means to the telephone line whereby transmitted coded numbers can be communicated over the telephone line;
   sequencer means connected to said number transmitting means for sequentially causing a predetermined series of coded numbers to be transmitted to said telephone line connection means, said predetermined series of coded numbers including the telephone number of a central station and further including a unique address;
   low-power source means capacitively coupled to said telephone line for drawing inductively coupled AC line power from the telephone line and further operable for regulating said drawn power; and
   perpetual timer means powered by said low-power source means for periodically causing said sequencer means to transmit said sequence of numbers to said central station.

2. The device according to claim 1 wherein said coded numbers comprise dual-tone multi-frequency (DTMF) codes.

3. The device according to claim 1 wherein said coded telephone numbers comprise dial pulse telephone codes.

4. A remote transmitting device for periodically reporting to a central station over a telephone line comprising:
   telephone interfacing means electrically connected to the telephone line for transmitting information;
   automatic dialing means connected to said telephone interfacing means for transmitting a telephone number corresponding to the central station;
   timer means connected to said dialing means for periodically causing said automatic dialing means to transmit said telephone number corresponding to the central station; and
   low-power source means capacitively connected to the telephone line for drawing inductively coupled AC power from a long wire line and for powering said timer means.

5. A remote transmitting device connected to a telephone line comprising:
   telephone line connection means electrically connected to the telephone line for transmitting and receiving information;
   tone signalling means electrically connected to said telephone line connection means for transmitting tones;
   tone sequencer means electrically connected to said tone signalling means and operable in a first mode for causing said tone signalling means to transmit a telephone number corresponding to a central receiving site, said tone sequencer means operable in a second mode for causing said tone signalling means to transmit a sequence of tones corresponding to an address;
   long duration timer means for periodically causing said tone sequencer means to operate in a first mode wherein said telephone number is transmitted by said tone signalling means through said telephone lines, said long duration timer means further operable for causing said tone sequencer means to operate in a second mode wherein said address is transmitted by said tone signalling means to the telephone line; and
   low-power storage means electrically connected between said telephone line and said long duration timer means and operable for drawing inductively coupled AC power from said telephone line for powering said long duration timer means, said low-power storage means being capacitively coupled to the telephone line.

6. The device according to claim 5 wherein said tone sequencer means further includes a third mode for transmitting a sequence of numbers corresponding to the status of a device being monitored.

7. The device according to claim 5 further including a sensor means electrically connected to said tone sequencer means for causing said tone sequencer means to operate in a third mode, said third mode corresponding to transmitting the inverted value of said address.

8. A device for monitoring utility meters and transmitting the status thereof over telephone lines, comprising:
   telephone line connection means electrically connected to said telephone line;
   DTMF signalling means electrically connected to said telephone line connection means for transmitting standard telephone DTMF tones;
   sequencer means electrically connected to said DTMF tone signalling means for causing a sequence of tones to be transmitted, said sequence of tones including a first series corresponding to a telephone number of a central reporting station, said sequence of tones further including a second series corresponding to an address of the utility meter, said sequence of tones further including a third series corresponding to the status of the utility meter;
   timer means electrically connected to said sequencer means for causing the remote sensing device to periodically call the central reporting station and transmit the status of the utility meter; and
   low-power source means electrically connected to said timer means and further capacitively connected to the telephone line for drawing inductively coupled AC power from the telephone line for use in powering said timer means.

9. The device according to claim 8 further including counter means electrically connected to said sequencer means for counting utility meter usage and further operable for providing said sequencer with said third series corresponding to said utility meter usage.

10. The device according to claim 8 further including a medium-power source means electrically connected to said telephone line for drawing current directly from the telephone line and for powering said telephone line transmitting means, DTMF signalling means, and sequencer means.

11. A remote utility sensing device for monitoring a utility meter and reporting utility usage to a portable peripheral device, comprising:

sensing means connected to the utility meter for generating digital pulses in response to the utility usage;

counter means connected to said sensing means for counting and storing said digital pulses;

interface means connected to said counter means for transmitting values stored in said counter means to the portable peripheral device; and power source means capacitively coupled to a long wire for drawing inductively coupled AC line power, and further operable for rectifying and low-pass filtering said power for powering said remote utility sensing device.

12. The device according to claim 11 wherein said long wire is a telephone line.

13. The device according to claim 11 wherein said counter means is implemented using CMOS circuitry.

14. The device according to claim 11 further including addressing means connected to said interface means for supplying a unique address to the portable peripheral device.

15. The device according to claim 11 wherein said interface means is implemented using parallel data transmission from said counter means to the portable peripheral device.

16. The device according to claim 11 wherein said interface means is implemented using serial data transmission from said counter means to the portable peripheral device.

17. The device in accordance with claim 4, wherein the telephone interfacing means electrically connected to the telephone line further comprises means for receiving information.

18. The device in accordance with claim 5, wherein the tone signalling means includes DTMF tone signalling means.

* * * * *